United States Patent
Han et al.

(10) Patent No.: US 11,137,829 B2
(45) Date of Patent: Oct. 5, 2021

(54) DRIVE METHOD FOR DRIVING TOUCH APPARATUS, TOUCH APPARATUS AND TOUCH DISPLAY APPARATUS

(71) Applicant: BOE TECHNOLOGY GROUP CO., LTD., Beijing (CN)

(72) Inventors: Yanling Han, Beijing (CN); Xue Dong, Beijing (CN); Jing Lv, Beijing (CN); Haisheng Wang, Beijing (CN); Chunwei Wu, Beijing (CN); Xiaoliang Ding, Beijing (CN); Pengpeng Wang, Beijing (CN); Xueyou Cao, Beijing (CN); ChihJen Cheng, Beijing (CN); Wei Liu, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 11 days.

(21) Appl. No.: 16/099,109

(22) PCT Filed: Mar. 7, 2018

(86) PCT No.: PCT/CN2018/078254
§ 371 (c)(1),
(2) Date: Nov. 5, 2018

(87) PCT Pub. No.: WO2018/196483
PCT Pub. Date: Nov. 1, 2018

(65) Prior Publication Data
US 2019/0212820 A1   Jul. 11, 2019

(30) Foreign Application Priority Data
Apr. 27, 2017   (CN) .......................... 201710288374.1

(51) Int. Cl.
*G06F 3/01*    (2006.01)
*G06F 3/041*   (2006.01)
*G06F 3/044*   (2006.01)

(52) U.S. Cl.
CPC ............ *G06F 3/016* (2013.01); *G06F 3/0416* (2013.01); *G06F 3/0443* (2019.05);
(Continued)

(58) Field of Classification Search
CPC ...... G06F 3/016; G06F 3/0412; G06F 3/0416; G06F 3/04166; G06F 3/044; G06F 3/0443; G06F 3/0445; G06F 3/0446; E01B 9/36
(Continued)

(56) References Cited

U.S. PATENT DOCUMENTS

2010/0001973 A1* 1/2010 Hotelling ............ G02F 1/13338
                                                                345/174
2011/0291982 A1   12/2011 Hsieh et al.
(Continued)

FOREIGN PATENT DOCUMENTS

CN    101907922 A    12/2010
CN    102968231 A    3/2013
(Continued)

OTHER PUBLICATIONS

PCT International Search Report, Application No. PCT/CN2018/078254, dated Jun. 7, 2018, 6 pages: with English translation.
(Continued)

*Primary Examiner* — Kwin Xie
(74) *Attorney, Agent, or Firm* — Armstrong Teasdale LLP

(57) ABSTRACT

The present disclosure discloses a drive method for driving a touch apparatus. The touch apparatus includes a plurality of touch electrodes. In the drive method, a touch detection signal is applied to the plurality of touch electrodes within
(Continued)

a first time interval. A tactile feedback signal is applied to the plurality of touch electrodes within a second time interval. The first time interval and the second time interval are alternated but not overlapped. The present disclosure further discloses a touch apparatus and a touch display apparatus.

9 Claims, 8 Drawing Sheets

(52) U.S. Cl.
CPC .......... *G06F 3/0445* (2019.05); *G06F 3/0446* (2019.05); *G06F 3/04166* (2019.05); *G06F 3/0412* (2013.01)

(58) Field of Classification Search
USPC .................................................. 345/173–174
See application file for complete search history.

(56) References Cited

U.S. PATENT DOCUMENTS

| | | | | |
|---|---|---|---|---|
| 2012/0223880 | A1* | 9/2012 | Birnbaum | G06F 3/015 345/156 |
| 2013/0307789 | A1* | 11/2013 | Karamath | G06F 3/016 345/173 |
| 2017/0344165 | A1* | 11/2017 | Heo | G06F 3/04166 |

FOREIGN PATENT DOCUMENTS

| CN | 103150064 A | 6/2013 |
|---|---|---|
| CN | 104765501 A | 7/2015 |
| CN | 105045437 A | 11/2015 |
| CN | 105320349 A | 2/2016 |
| CN | 105446545 A | 3/2016 |
| CN | 105630238 A | 6/2016 |
| CN | 107122075 A | 9/2017 |

OTHER PUBLICATIONS

PCT Written Opinion, Application No. PCT/CN2018/078254, dated Jun. 7, 2018, 6 pages.: with English translation of relevant part.
China First Office Action, Application No. 201710288374.1, dated Mar. 29, 2019, 23 pps.: with English translation.

* cited by examiner

DRIVE METHOD FOR DRIVING TOUCH APPARATUS, TOUCH APPARATUS AND TOUCH DISPLAY APPARATUS

CROSS REFERENCE TO RELATED APPLICATIONS

This patent application is a National Stage Entry of PCT/CN2018/078254 filed on Mar. 7, 2018, which claims the benefit and priority of Chinese Patent Application No. 201710288374.1 filed on Apr. 27, 2017, the disclosures of which are incorporated herein by reference in their entirety as part of the present application.

BACKGROUND

The present disclosure relates to a drive method for driving a touch apparatus, a touch apparatus, and a touch display apparatus.

With continuous development of science and technology, various smart devices with touch functions spring up one after another and constantly enrich people's work and life. The smart devices with touch functions provide users with numerous brand new experiences, making operations convenient and swift. However, the users lose experiences of pressing physical keypads. In the meanwhile, there are strong demands for touch feedback. For example, feedback of touching real objects may be sensed by users when touching screens, such as, when the users play the game "Angry Birds" by using a touch apparatus, the users may sense an elastic force of rubber bands when they stretch slingshots, etc.

The emergence of electrostatic tactile feedback technology allows the users to sense a real tactile experience when they touch the screens. An existing electrostatic tactile feedback is implemented by laminating a separately-fabricated electrostatic touch layer onto a touch display apparatus. The existing electrostatic tactile feedback technologies mainly include two types as below.

One type of electrostatic tactile feedback technology is an electrostatic force technology proposed by Disney Research. Structures of an electrostatic touch layer adopting the electrostatic force technology include, from bottom to top, a glass substrate, a plane full of ITO electrodes, and an insulating layer. By applying an electric signal to the ITO electrodes, an electrostatic force is generated between a finger and the ITO electrodes and acts on the finger to provide the tactile feedback.

Another type of electrostatic tactile feedback technology is a difference-frequency signal electrostatic force technology provide by Senseg. In the difference-frequency signal electrostatic force technology, voltage signals of different frequencies are applied to intersected electrodes. A difference-frequency signal electrostatic force is generated at the intersection of the electrodes and acts on the finger to provide the tactile feedback.

BRIEF DESCRIPTION

A first aspect of the present disclosure provides a drive method for driving a touch apparatus. The touch apparatus includes a plurality of touch electrodes. In the drive method, a touch detection signal is applied to the plurality of touch electrodes within a first time interval. A tactile feedback signal is applied to the plurality of touch electrodes within a second time interval. The first time interval and the second time interval are alternated but not overlapped.

In some embodiments of the present disclosure, the method further includes determining a touch location of a touch after the touch detection signal is applied. The tactile feedback signal is applied to a touch electrode corresponding to the touch location within the second time interval.

In some embodiments of the present disclosure, the touch apparatus is a mutual-capacitance touch apparatus, and the plurality of touch electrodes include a plurality of touch drive electrodes and a plurality of touch sensing electrodes. The applying the touch detection signal to the plurality of touch electrodes within the first time interval includes applying a square-wave signal to the plurality of touch drive electrodes and setting the plurality of touch sensing electrodes to a floating state within the first time interval. The applying the tactile feedback signal to the plurality of touch electrodes within the second time interval includes applying a first voltage signal having a first frequency and a first amplitude to a touch drive electrode corresponding to the touch location, and applying a second voltage signal having a second frequency and a second amplitude to a touch sensing electrode corresponding to the touch location within the second time interval.

In some embodiments of the present disclosure, in the step of applying the first voltage signal having the first frequency and the first amplitude to the touch drive electrode corresponding to the touch location and applying the second voltage signal having the second frequency and the second amplitude to the touch sensing electrode corresponding to the touch location within the second time interval, an attribute of a displayed image at the touch location is obtained. Next, the first voltage signal and the second voltage signal corresponding to the attribute of the displayed image are determined. Next, the first voltage signal is applied to the touch drive electrode corresponding to the touch location and the second voltage signal is applied to the touch sensing electrode corresponding to the touch location within the second time interval.

In some embodiments of the present disclosure, in the step of applying the first voltage signal having the first frequency and the first amplitude to the touch drive electrode corresponding to the touch location and applying the second voltage signal having the second frequency and the second amplitude to the touch sensing electrode corresponding to the touch location within the second time interval, a tactile feedback region is determined based on the touch location. Next, the tactile feedback region is divided into a first tactile feedback subregion and a second tactile feedback subregion. Next, the first voltage signal having the first frequency and the first amplitude is applied to a touch drive electrode in the tactile feedback region, a third voltage signal having a third frequency and a third amplitude is applied to a touch sensing electrode in the first tactile feedback subregion, and a fourth voltage signal having a fourth frequency and a fourth amplitude is applied to a touch sensing electrode in the second tactile feedback subregion within the second time interval.

In some embodiments of the present disclosure, in the step of applying the first voltage signal having the first frequency and the first amplitude to the touch drive electrode corresponding to the touch location and applying the second voltage signal having the second frequency and the second amplitude to the touch sensing electrode corresponding to the touch location within the second time interval, a movement direction of the touch is determined. Next, a tactile feedback region is determined based on the touch location and the movement direction, and the tactile feedback region is divided into a first tactile feedback subregion and a second tactile feedback subregion. Next, the first voltage signal having the first frequency and the first amplitude is applied to a touch drive electrode in the tactile feedback region, a third voltage signal having a third frequency and a third amplitude is applied to a touch sensing electrode in the first tactile feedback subregion, and a fourth voltage signal having a fourth frequency and a fourth amplitude is applied to a touch sensing electrode in the second tactile feedback subregion within the second time interval.

In some embodiments of the present disclosure, the touch apparatus is a self-capacitance touch apparatus. The applying the touch detection signal to the plurality of touch electrodes within the first time interval includes applying the touch detection signal to the touch electrodes within the first time interval.

The applying the tactile feedback signal to the plurality of touch electrodes within the second time interval includes applying the tactile feedback signal to the touch electrode corresponding to the touch location within the second time interval.

In some embodiments of the present disclosure, in the step of applying the tactile feedback signal to the touch electrode corresponding to the touch location within the second time interval, an attribute of a displayed image at the touch location is obtained. Next, a voltage amplitude corresponding to the attribute of the displayed image is determined. Next, a tactile feedback signal having the voltage amplitude is applied to the touch electrode corresponding to the touch location within the second time interval.

In some embodiments of the present disclosure, in the step of applying the tactile feedback signal to the touch electrode corresponding to the touch location within the second time interval, a tactile feedback region is determined based on the touch location. Next, the tactile feedback region is divided into a first tactile feedback subregion and a second tactile feedback subregion. Next, a third voltage signal having a third amplitude is applied to a touch electrode in the first tactile feedback subregion and a fourth voltage signal having a fourth amplitude is applied to a touch electrode in the second tactile feedback subregion within the second time interval.

In some embodiments of the present disclosure, in the step of applying the tactile feedback signal to the touch electrode corresponding to the touch location within the second time interval, a movement direction of the touch is determined. Next, a tactile feedback region is determined based on the touch location and the movement direction, and the tactile feedback region is divided into a first tactile feedback subregion and a second tactile feedback subregion. Next, a third voltage signal having a third amplitude is applied to a touch electrode in the first tactile feedback subregion and a fourth voltage signal having a fourth amplitude is applied to a touch electrode in the second tactile feedback subregion within the second time interval.

In some embodiments of the present disclosure, a shape of the tactile feedback region is a rectangle. The shapes of the first tactile feedback subregion and the second tactile feedback subregion are two equal-area right triangles constituting the rectangle. The touch location is positioned at a right angle of the first tactile feedback subregion or the second tactile feedback subregion.

A second aspect of the present disclosure provides a touch apparatus. The touch apparatus includes a touch electrode, at least one processor, and at least one memory storing a computer program. The touch apparatus is configured to, when the computer program is executed by the at least one processor, perform the drive method for driving the touch apparatus according to the first aspect of the present disclosure.

In some embodiments of the present disclosure, the touch apparatus is an in-cell touch apparatus, an on-cell touch apparatus, or a One Glass Solution (OGS) touch apparatus.

In some embodiments of the present disclosure, the touch apparatus is a mutual-capacitance touch apparatus or a self-capacitance touch apparatus.

A third aspect of the present disclosure provides a touch display apparatus. The touch display apparatus includes the touch apparatus according to the second aspect of the embodiments of the present disclosure.

DETAILED DESCRIPTION

The present disclosure is further described in detail with reference to the accompanying drawings to make the technical solutions, and advantages of the present disclosure clearer.

It is to be noted that all expressions using "first" and "second" in embodiments of the present disclosure are intended to distinguish two different entities or different parameters having the same names. Thus, "first" and "second" are merely for ease of expression, but should not be interpreted as limitations to the embodiments of the present disclosure, which is not repeated in the following embodiments.

The existing electrostatic tactile feedback is realized by laminating a separately-fabricated electrostatic touch layer onto a touch display apparatus. This technology cannot be used in combination with mainstream capacitive touch technologies. The electrostatic touch layer used for implementing the tactile feedback is the closest layer to a finger. Therefore, if the capacitive touch technologies are used in the touch display apparatus, the electrostatic touch layer may block a capacitive touch signal of the touch display apparatus. In such a case, the touch display apparatus needs to adopt an optical touch technology.

The embodiments of the present disclosure provide a drive method for driving a touch apparatus. By using this drive method, the electrostatic touch layer used for tactile feedback can be used in combination with mainstream capacitive touch apparatuses.

The touch apparatus includes a plurality of touch electrodes. The structure of the touch apparatus is not limited here. It may be an in-cell touch panel, an on-cell touch panel, or a one glass solution (OGS) touch panel, etc. The integration manner of the touch apparatus are not limited. The touch apparatus can not only be integrated with a mutual-capacitance touch apparatus, but also be integrated with a self-capacitance touch apparatus. The display apparatus is also not limited, and it may be a liquid crystal display (LCD) device or an organic light-emitting display (OLED) device, etc. The detailed design of an electrode pattern of the touch apparatus may adopt the design for an existing touch apparatus.

Figure 1:
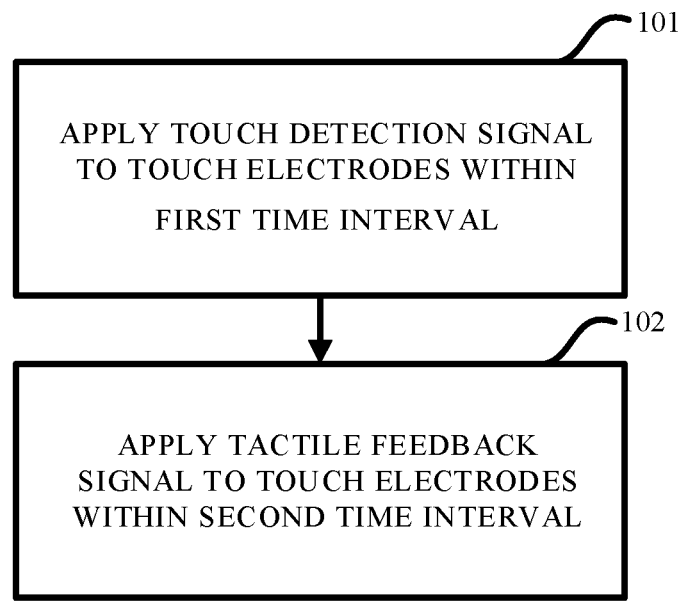
FIG. 1 is a schematic flow diagram of a drive method for driving a touch apparatus according to an embodiment of the present disclosure.

FIG. 1 illustrates a schematic flow diagram of a drive method for driving a touch apparatus according to an embodiment of the present disclosure.

In the drive method for driving the touch apparatus, in step 101, a touch detection signal is applied to the plurality of touch electrodes within a first time interval. The touch detection signal may be used for a touch positioning detection. The first time interval may be set according to needs as long as it can be ensured that the varying touch signal can be detected. Furthermore, a specific drive waveform of the touch detection signal may be not limited as long as the touch detection signal can be applied to the touch electrode and can be used for positioning detection.

In step 102, a tactile feedback signal is applied to the plurality of touch electrodes within a second time interval. The tactile feedback signal may be used for realizing tactile feedback. The second time interval may be set according to needs as long as it can be ensured that the generated tactile feedback signal is able to cause a user to feel a corresponding sense of tactile feedback. Furthermore, a drive waveform of the tactile feedback signal may not be limited specifically as long as the tactile feedback signal can be applied to the touch electrode and is sufficient to be used for tactile feedback.

In some embodiments of the present disclosure, the first time interval and the second time interval are alternated but not overlapped. Here, the first time interval and the second time interval are not overlapped, which may mean that there is no time interval between the first time interval and the second time interval, or may mean that there is a necessary time interval between the first time interval and the second time interval to distinguish the two signals. The first time interval and the second time interval may constitute one control cycle. Alternatively, one control cycle may be constituted by the first time interval, the second time interval, and a necessary time interval between the first time interval and the second time interval. Furthermore, in addition to the first time interval and the second time interval, the control cycle also may have a third time interval for implementing drive for display.

As can be seen from the above embodiments, in the drive method for driving the touch apparatus according to the embodiments of the present disclosure, the touch electrode of the touch apparatus is used as the tactile feedback electrode or the touch detection electrode in different time intervals, and a tactile feedback function and a touch positioning detection function are implemented respectively in the corresponding time intervals. Two touch functions are implemented by using one touch apparatus. By using this drive method, the electrostatic touch layer used for tactile feedback can be used in combination with mainstream capacitive touch apparatuses. Furthermore, both the fabrication process of a touch display panel and the entire thickness of a module are reduced.

Figure 2:
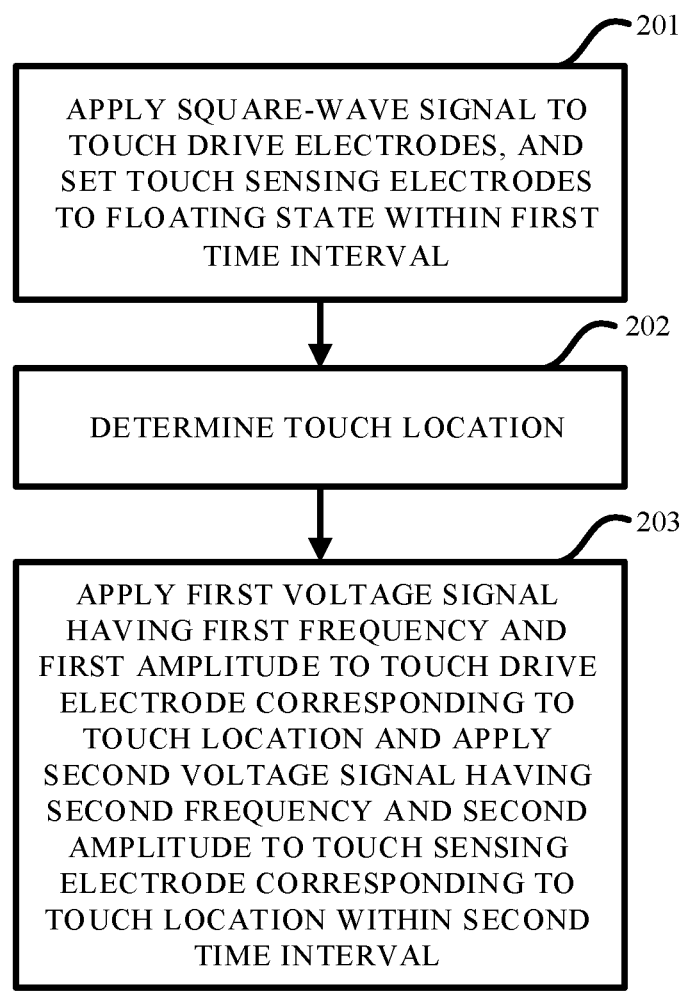
FIG. 2 is a schematic flow diagram of a drive method for driving a touch apparatus according to an embodiment of the present disclosure.

FIG. 2 illustrates a schematic flow diagram of a drive method for driving a touch apparatus according to a further embodiment of the present disclosure.

Figure 3A:
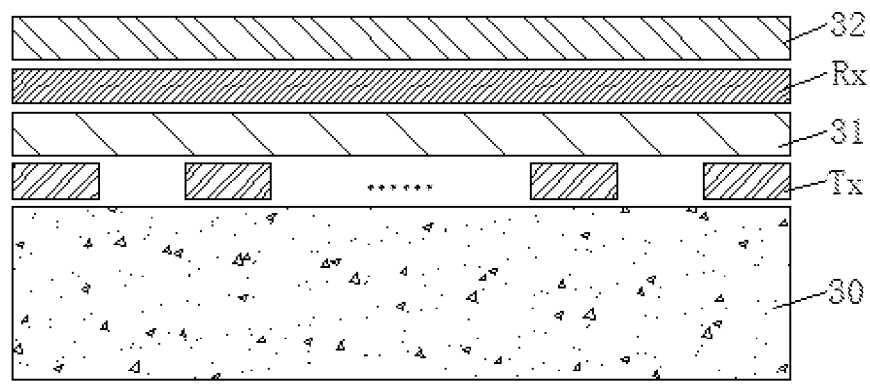
FIG. 3A is a schematic diagram of a cross-sectional structure of a touch apparatus according to an embodiment of the present disclosure which is an on-cell mutual-capacitance touch apparatus.
Figure 3B:
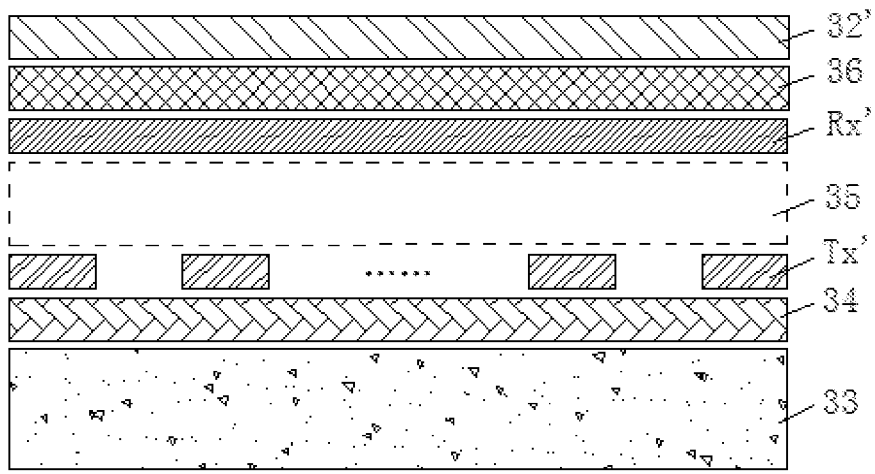
FIG. 3B is a schematic diagram of a cross-sectional structure of a touch apparatus according to an embodiment of the present disclosure which is an in-cell mutual-capacitance touch apparatus.
Figure 3C:
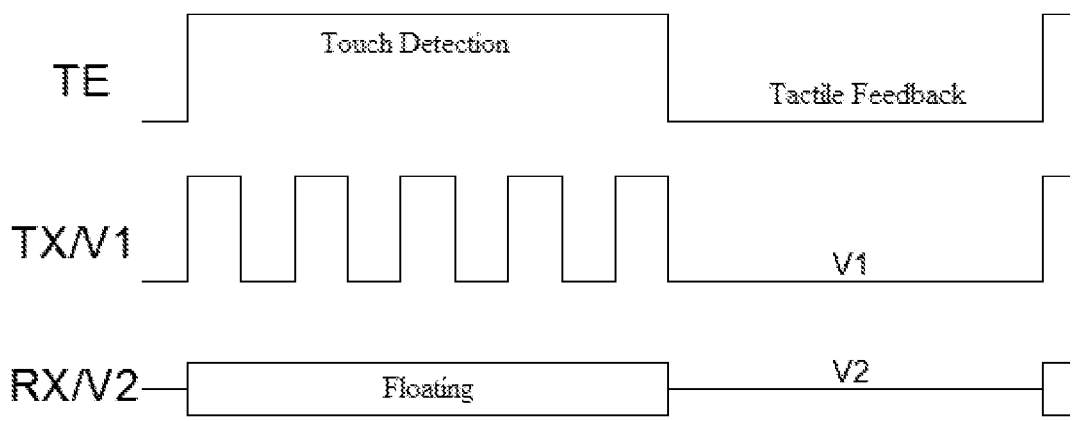
FIG. 3C is a timing diagram of signals applied to a touch electrode according to an embodiment of the present disclosure.

In this embodiment, the touch apparatus is a mutual-capacitance touch apparatus. The plurality of touch electrodes include a plurality of touch drive electrodes and a plurality of touch sensing electrodes. The mutual-capacitance touch apparatus may be an on-cell mutual-capacitance touch apparatus or may be an in-cell mutual-capacitance touch apparatus. FIG. 3A illustrates the on-cell mutual-capacitance touch apparatus. In the on-cell mutual-capacitance touch apparatus, there are sequentially provided with, from bottom to top, a liquid crystal display panel 30, strip-shaped touch drive electrodes Tx arranged at equal intervals, an insulating layer 31, strip-shaped touch sensing electrodes Rx arranged at equal intervals and perpendicular to the touch drive electrodes Tx, and a covering layer 32. FIG. 3B illustrates the in-cell mutual-capacitance touch apparatus. In the in-cell mutual-capacitance touch apparatus, there are sequentially provided with, from bottom to top, a backlight module 33, an array substrate 34, strip-shaped touch drive electrodes Tx' arranged at equal intervals, a liquid crystal layer 35, strip-shaped touch sensing electrodes Rx' arranged at equal intervals and perpendicular to the touch drive electrodes Tx', a color film substrate 36, and a covering layer 32'. FIG. 3C illustrates a timing diagram of signals applied to the touch electrode according to an embodiment of the present disclosure.

The drive method for driving the touch apparatus is introduced in detail below with reference to FIGS. 3A-3C. In this embodiment, a touch detection state and a tactile feedback state may be distinguished by using, for example, a synchronization signal TE. In step 201, within the first time interval, the synchronization signal TE may be at, for example, a high level when representing the touch detection state. A square-wave signal is applied to the plurality of touch drive electrodes, and the plurality of touch sensing electrodes are set to a floating state within the first time interval. In this way, detection of the touch signal may be implemented. The first time interval may be set according to needs as long as it can be ensured that the varying touch signal can be detected.

In step 202, the touch location may be determined based on, for example, the detected touch signal.

In step 203, within the second time interval, the synchronization signal TE may be at, for example, a low level when representing the tactile feedback state. At this time interval, a first voltage signal V1 having a first frequency and a first amplitude is applied to the touch drive electrode corresponding to the touch location. A second voltage signal V2 having a second frequency and a second amplitude is applied to the touch sensing electrode corresponding to the touch location. Tactile feedback based on a difference-frequency electrostatic force technology may be realized by applying the first voltage signal V1 and the second voltage signal V2 having different amplitudes and different frequencies to the touch drive electrode and the touch sensing electrode corresponding to the touch location respectively. The second time interval may be set according to needs as long as it can be ensured that the generated tactile feedback signal is able to cause a user to feel a corresponding sense of tactile feedback.

As can be seen from the above embodiments, the drive method for driving a touch apparatus provided by the embodiments of the present disclosure can be successfully applied to a mutual-capacitance touch apparatus. The touch drive electrode and the touch sensing electrode of the mutual-capacitance touch apparatus are used as the touch detection electrode and the tactile feedback electrode, thus the tactile feedback function and the touch positioning detection function are implemented respectively in different time intervals. Two touch functions are implemented by using one touch apparatus. By using this drive method, the electrostatic touch layer used for tactile feedback can be used in combination with mainstream capacitive touch apparatuses. Furthermore, both the fabrication process of a touch display panel and the entire thickness of a module are reduced.

In this embodiment of the present disclosure, in the step 203 of applying the first voltage signal having the first frequency and the first amplitude to the touch drive electrode corresponding to the touch location and applying the second voltage signal having the second frequency and the second amplitude to the touch sensing electrode corresponding to the touch location within the second time interval, an attribute of a displayed image at the touch location may be obtained. The attribute of the displayed image refers to the attribute of the image displayed by the display panel corresponding to the touch location. For example, the displayed image may be a piece of silk, a set of wooden furniture, or a pot having an anti-sticking coating, etc. Different articles have different senses of tactile feedback. These articles have their own attributes.

Next, the first voltage signal and the second voltage signal corresponding to the attribute of the displayed image are determined. Here, a correspondence list may be preset in some embodiments of the present disclosure. In this correspondence list, the attributes of the displayed images of the articles correspond to the predetermined first voltage signal and the predetermined second voltage signal respectively. When the attribute of the displayed image at the touch location is obtained, this correspondence list is looked up, such that the first voltage signal and the second voltage signal used for generating a tactile feedback signal may be obtained. Of course, the correspondence between the attributes of the displayed images and the first voltage signal and the second voltage signal may be designed in other ways, which are not limited here.

Within the second time interval, the first voltage signal is applied to the touch drive electrode corresponding to the touch location and the second voltage signal is applied to the touch sensing electrode corresponding to the touch location to generate the sense of tactile feedback corresponding to the attribute of the displayed image.

In this way, the first voltage signal and the second voltage signal corresponding to the attribute of the displayed image at the touch location are applied to the touch location, such that the sense of tactile feedback felt by the user when the user touches the touch location corresponds to the attribute of the displayed image, which can optimize a real degree of the sense of tactile feedback.

Figure 4:
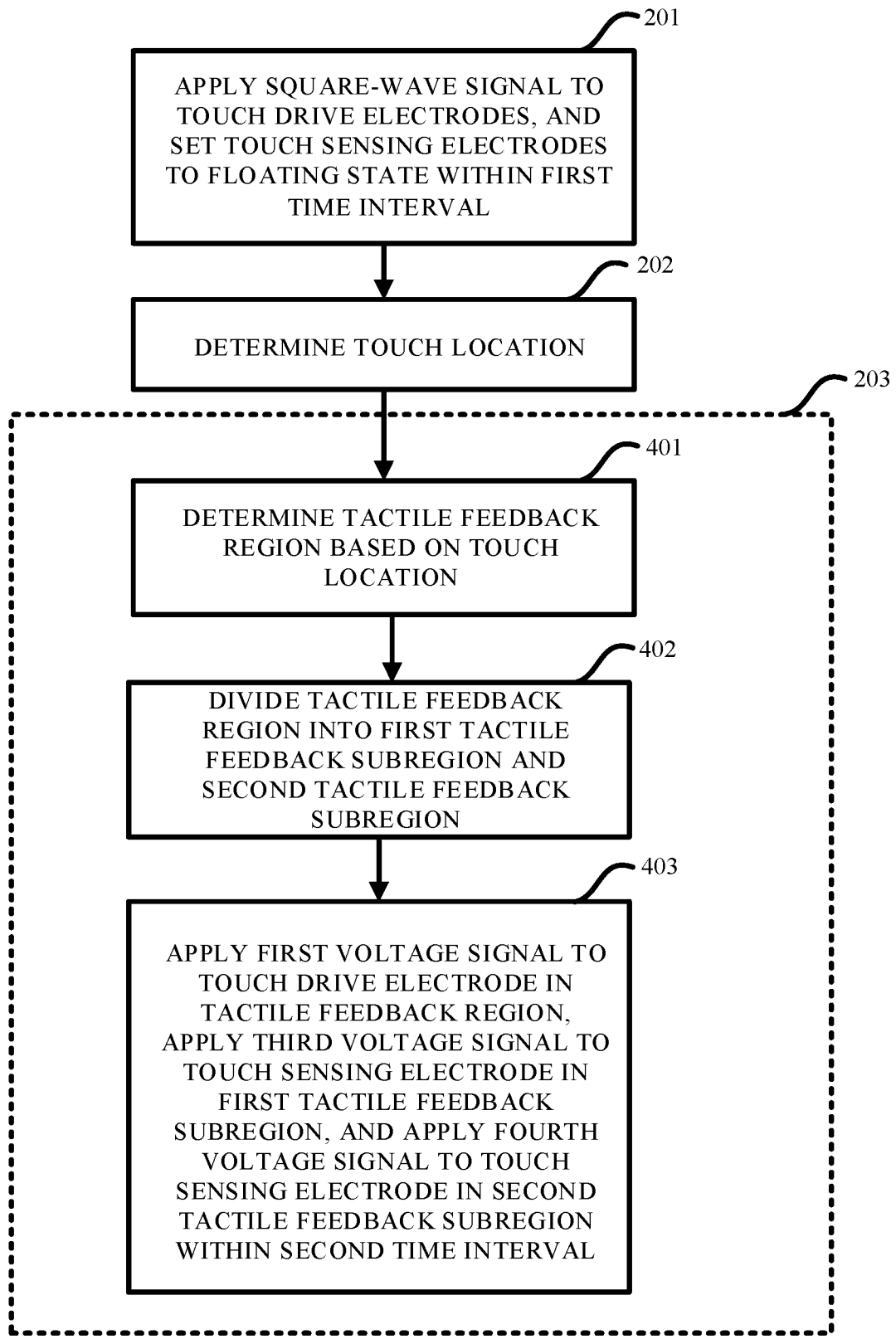
FIG. 4 is a schematic flow diagram of a drive method for driving a touch apparatus according to an embodiment of the present disclosure.

FIG. 4 illustrates a schematic flow diagram of a drive method for driving a touch apparatus according to a further embodiment of the present disclosure. Further exemplary description of step 203 in FIG. 2 is made in FIG. 4.

A tactile feedback region is determined based on the touch location in step 401. The tactile feedback region may be a region whose center is the touch location, or a region formed by taking the touch location as a corner of the tactile feedback region, or merely a region containing the touch location.

In step 402, the tactile feedback region is divided into a first tactile feedback subregion and a second tactile feedback subregion. The first tactile feedback subregion and the second tactile feedback subregion may be obtained by partitioning the tactile feedback region by taking a symmetric axis of the tactile feedback region as a boundary line or may be obtained based on arbitrary partition. A specific partitioning method is not limited thereto.

In step 403, the first voltage signal having the first frequency and the first amplitude is applied to the touch drive electrode in the tactile feedback region, a third voltage signal having a third frequency and a third amplitude is applied to the touch sensing electrode in the first tactile feedback subregion, and a fourth voltage signal having a fourth frequency and a fourth amplitude is applied to the touch sensing electrode in the second tactile feedback subregion, within the second time interval. Thus, the sense of tactile feedback in the first tactile feedback subregion is different from the sense of tactile feedback in the second tactile feedback subregion because of voltage difference, such that variation of sense of tactile feedback in the tactile feedback region can be realized. In this way, the user may have a discrepant sense of tactile feedback, and thus the user's sense of tactile feedback is enriched.

Figure 5:
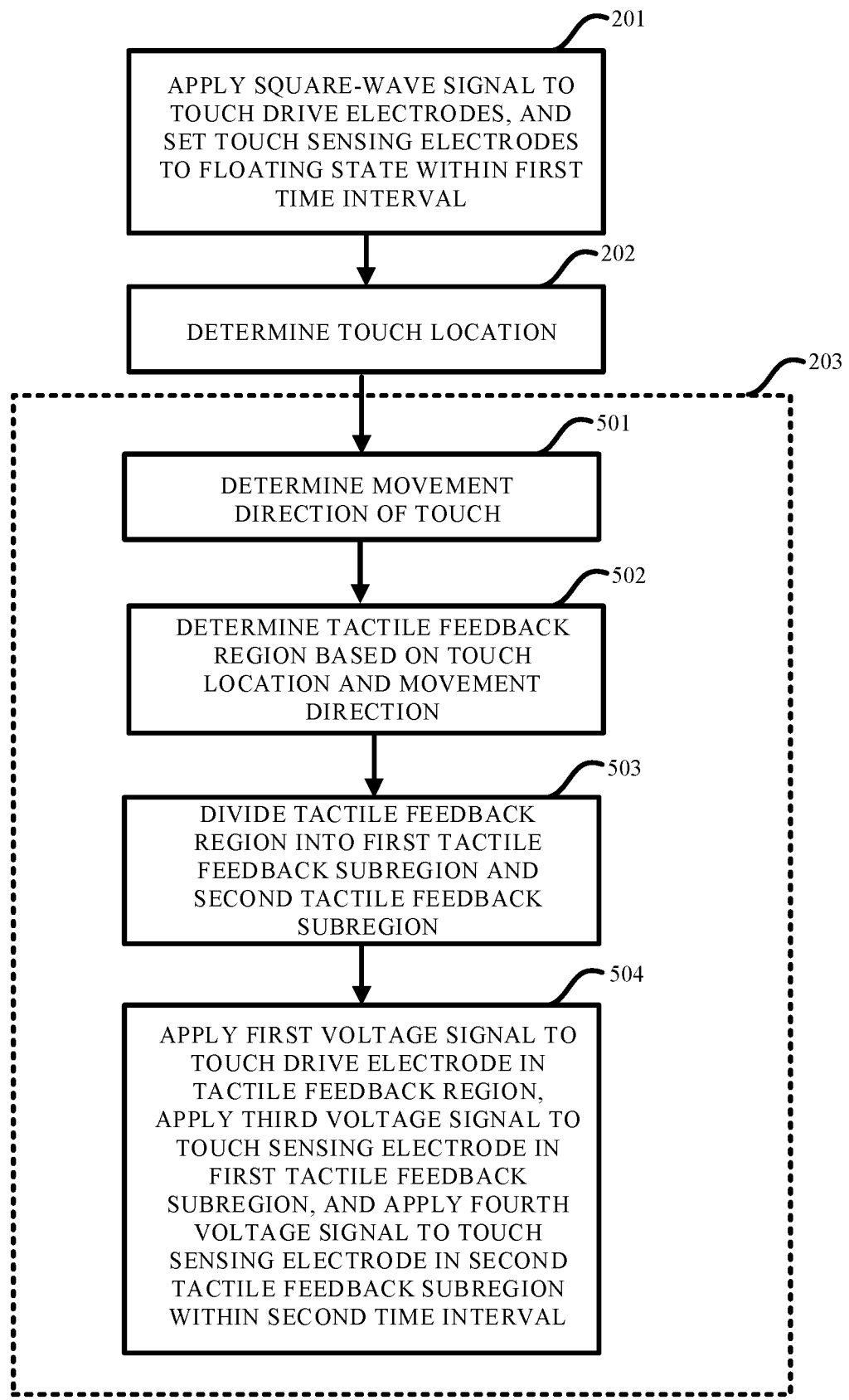
FIG. 5 is a schematic flow diagram of a drive method for driving a touch apparatus according to an embodiment of the present disclosure.

FIG. 5 illustrates a schematic flow diagram of a drive method for driving a touch apparatus according to the embodiments of the present disclosure. Further exemplary description of step 203 in FIG. 2 is made in FIG. 5.

A movement direction of the touch is determined in step 501. The movement direction of a finger of the user (i.e., the movement direction of the touch) can be obtained based on the touch location corresponding to the touch signal obtained from the first detection and the touch location corresponding to the touch signal obtained from the second detection.

A tactile feedback region is determined based on the touch location and the movement direction in step 502. Supposing it is decided that the user is sliding the finger from left to right based on the movement direction, the region on the right of the touch location is going to be touched by the user. In this case, the tactile feedback region is determined based on the touch location and the movement direction, which can generate the tactile feedback to the user more accurately.

In step 503, the tactile feedback region is divided into a first tactile feedback subregion and a second tactile feedback subregion. The first tactile feedback subregion and the second tactile feedback subregion may be obtained by partitioning the tactile feedback region by taking a symmetric axis of the tactile feedback region as a boundary line or may be obtained based on arbitrary partition. A specific partitioning method is not limited thereto.

In step 504, the first voltage signal having the first frequency and the first amplitude is applied to the touch drive electrode in the tactile feedback region, a third voltage signal having a third frequency and a third amplitude is applied to the touch sensing electrode in the first tactile feedback subregion, and a fourth voltage signal having a fourth frequency and a fourth amplitude is applied to the touch sensing electrode in the second tactile feedback subregion, within the second time interval. Thus, the sense of tactile feedback in the first tactile feedback subregion is different from the sense of tactile feedback in the second tactile feedback subregion because of voltage difference, such that variation of sense of tactile feedback in the tactile feedback region can be realized. In this way, the user may have a discrepant sense of tactile feedback, and thus the user's sense of tactile feedback is enriched.

Figure 6:
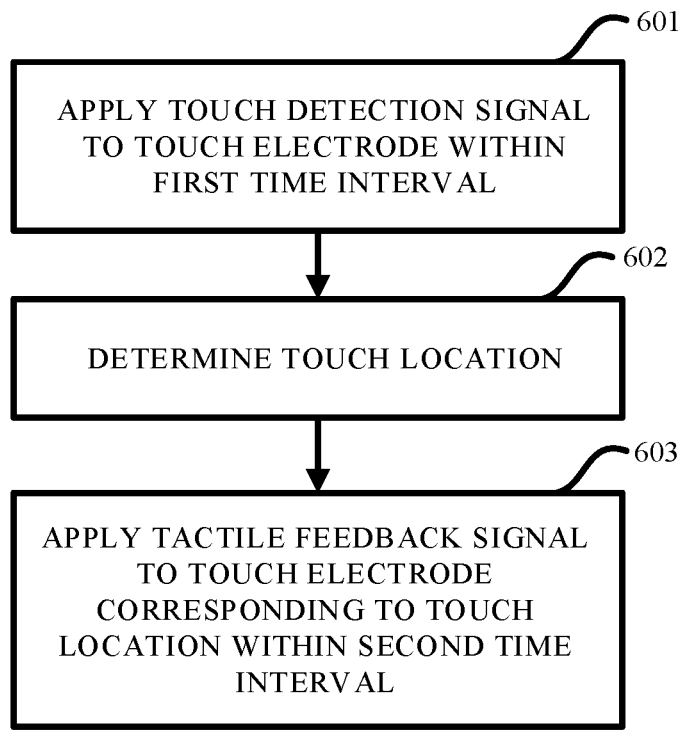
FIG. 6 is a schematic flow diagram of a drive method for driving a touch apparatus according to an embodiment of the present disclosure.

FIG. 6 illustrates a schematic flow diagram of a drive method for driving a touch apparatus according to a further embodiment of the present disclosure.

Figure 7:
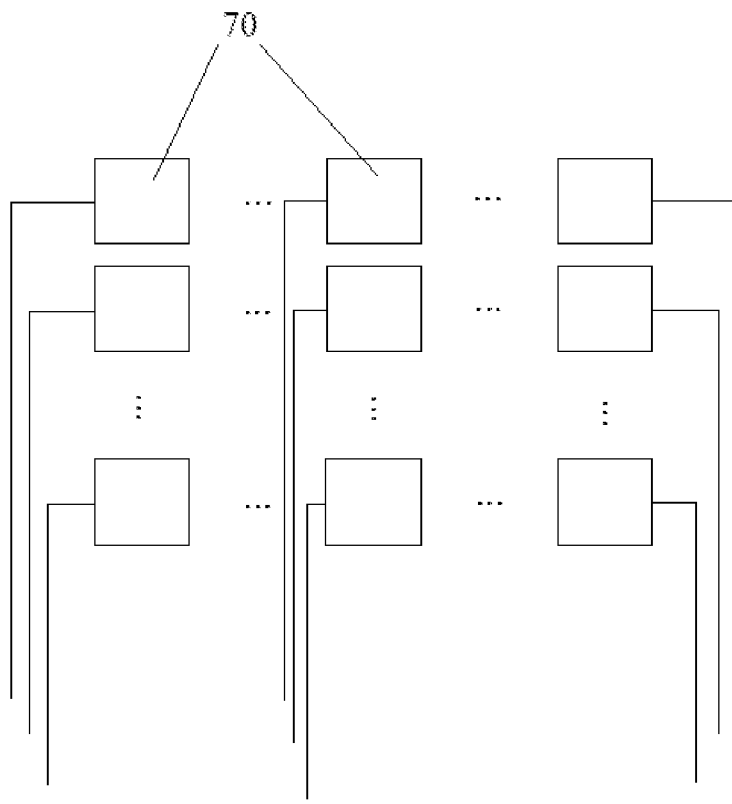
FIG. 7 is a schematic structural diagram of a touch apparatus according to an embodiment of the present disclosure.

In this embodiment, the touch apparatus is a self-capacitance touch apparatus. As shown in FIG. 7, touch electrodes included in the self-capacitance touch apparatus may constitute a plurality of regions 70, and the touch detection signal and the tactile feedback signal may be independently applied to each of the regions 70. In this way, multi-point tactile feedback may be realized in the case that an electrostatic force technology proposed by Disney Research is used to implement tactile feedback.

As shown in FIG. 6, the touch detection signal is applied to the touch electrode within the first time interval in step 601. When the finger of the user touches the surface of the touch apparatus, the capacitance value of the corresponding touch electrode fluctuates, such that variation of the touch signal at the corresponding location can be detected. The first time interval may be set according to needs as long as it can be ensured that the varying touch signal can be detected. A specific drive waveform of the touch detection signal may not be limited as long as the touch detection signal can be applied to the touch electrode and can be used for positioning detection.

In step 602, the touch location may be determined based on, for example, the detected touch signal.

In step 603, within the second time interval, the tactile feedback signal is applied to the touch electrode corresponding to the touch location to realize the tactile feedback at the corresponding location. The second time interval may be set according to needs as long as it can be ensured that the generated tactile feedback signal is able to cause a user to feel a corresponding sense of tactile feedback. A specific drive waveform of the tactile feedback signal may be not limited as long as the tactile feedback signal can be applied to the touch electrode and can be sufficiently used for tactile feedback.

As can be seen from the above embodiments, the drive method for driving a touch apparatus provided by the embodiments of the present disclosure can be successfully applied to the self-capacitance touch apparatus. The touch electrode of the self-capacitance touch apparatus is used as the tactile feedback electrode or the touch detection electrode in different time intervals, and a tactile feedback function and a touch positioning detection function are implemented respectively in the corresponding time intervals. Two touch functions are implemented by using one touch apparatus. By using this drive method, the electrostatic touch layer used for tactile feedback can be used in combination with mainstream capacitive touch apparatuses. Furthermore, both the fabrication process of a touch display panel and the entire thickness of a module are reduced. Moreover, partition control is performed on the touch electrodes to implement the tactile feedback in different regions respectively, and thus a voltage is merely applied to electrodes used for realizing the tactile feedback. In this way, it is unnecessary to apply different voltages to the touch drive electrode and the touch sensing electrode respectively, just like in the mutual-capacitance touch apparatus. Thus, power consumption is reduced. In the meanwhile, performing partition control on the touch electrodes can realize multipoint tactile feedback, and thus enriches the touch experience.

In some embodiments of the present disclosure, in the step 603 of applying the tactile feedback signal to the touch electrode corresponding to the touch location within the second time interval, the attribute of the displayed image at the touch location may be obtained. The attribute of the displayed image refers to the attribute of the image displayed by the display panel corresponding to the touch location. For example, the displayed image may be a piece of silk, a set of wooden furniture, or a pot having an anti-sticking coating, etc. Different articles have different senses of tactile feedback. These articles have their own attributes.

Next, the voltage amplitude of the tactile feedback signal corresponding to the attribute of the displayed image is determined. Here, a correspondence list may be preset in some embodiments of the present disclosure. In this correspondence list, the attributes of the displayed images of the articles correspond to preset voltage amplitudes respectively. When the attribute of the displayed image at the touch location is obtained, this correspondence list is looked up, such that the voltage amplitude of the corresponding tactile feedback signal may be obtained. Of course, the correspondence between the attributes of the displayed images and the voltage amplitude of the tactile feedback signal may be designed in other ways, which are not limited here.

Within the second time interval, the tactile feedback signal having said voltage amplitude is applied to the touch electrode corresponding to the touch location, such that the sense of tactile feedback corresponding to the attribute of the displayed image is generated.

In this way, the tactile feedback signal having the voltage amplitude corresponding to the attribute of the displayed image at the touch location is applied to the touch location, such that the sense of tactile feedback felt by the user when the user touches the touch location corresponds to the attribute of the displayed image, which can optimize a degree of reality of the sense of tactile feedback.

Figure 8:
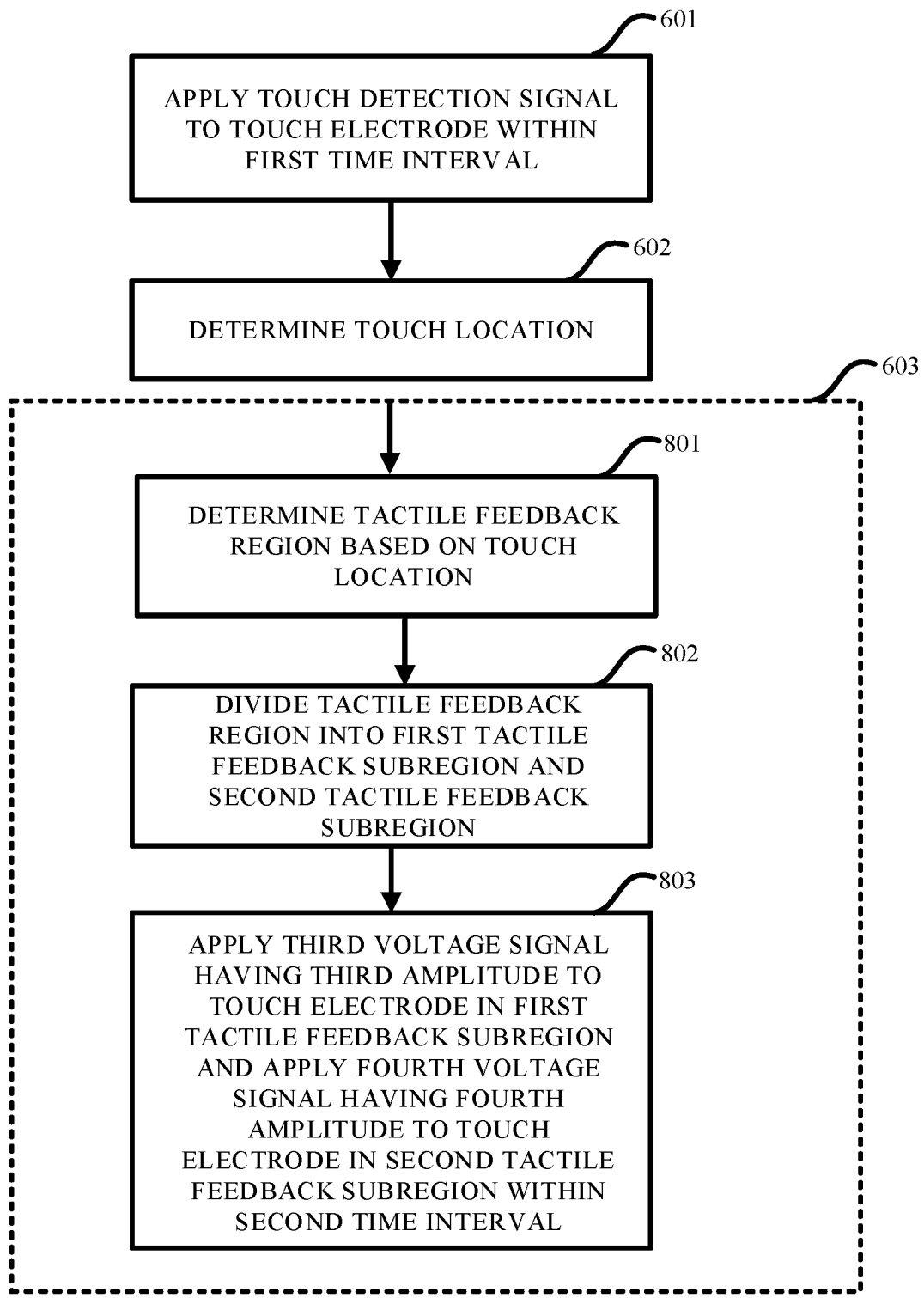
FIG. 8 is a schematic flow diagram of a drive method for driving a touch apparatus according to an embodiment of the present disclosure.

FIG. 8 illustrates a schematic flow diagram of a drive method for driving a touch apparatus according to a further embodiment of the present disclosure. Further exemplary description of step 603 in FIG. 6 is made in FIG. 8.

The tactile feedback region is determined based on the touch location in step 801. The tactile feedback region may be a region whose center is the touch location, or a region formed by taking the touch location as a corner of the tactile feedback region, or merely a region containing the touch location. The tactile feedback region includes at least one said region 70.

Figure 10:
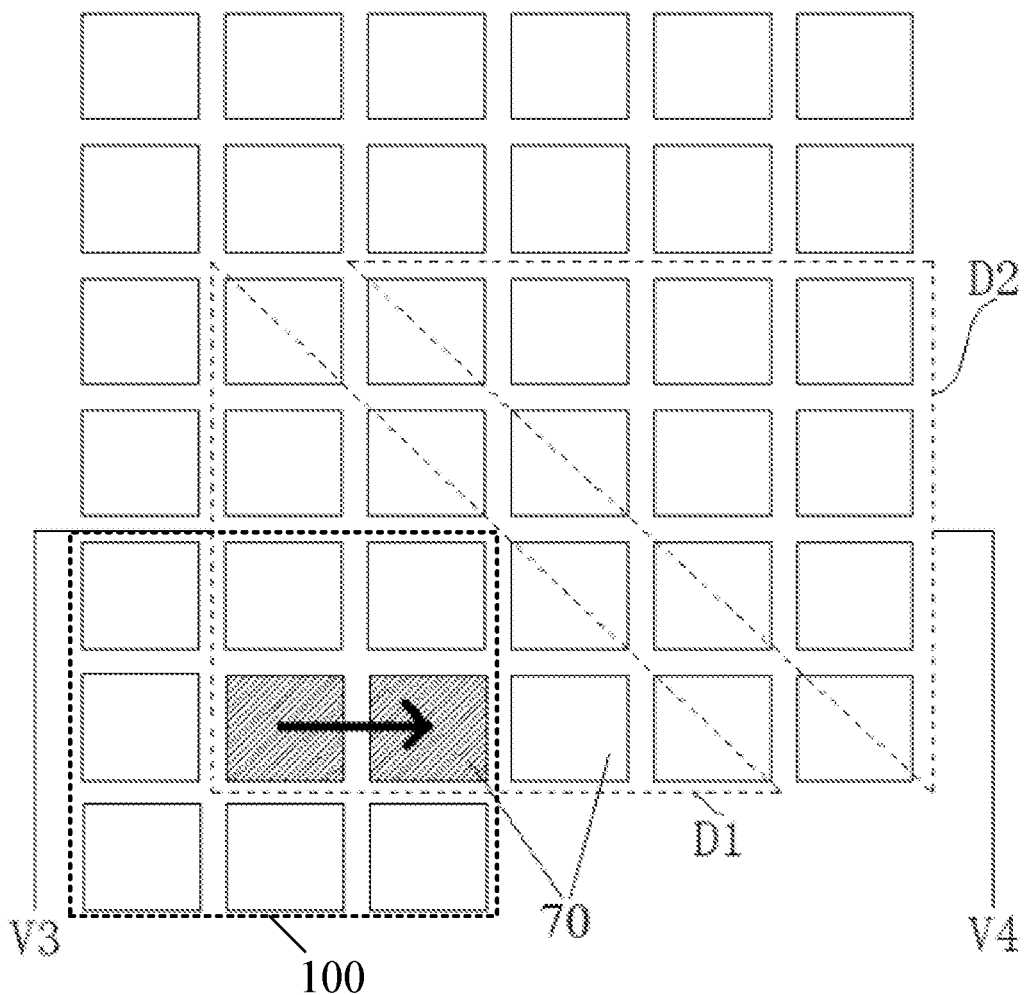
FIG. 10 is a schematic diagram of applying different voltages to touch electrodes in different tactile feedback subregions of the touch apparatus according to an embodiment of the present disclosure.

In step 802, the tactile feedback region is divided into the first tactile feedback subregion and the second tactile feedback subregion (see FIG. 10). The first tactile feedback subregion and the second tactile feedback subregion may be obtained by partitioning the tactile feedback region by taking a symmetric axis of the tactile feedback region as a boundary line or may be obtained based on arbitrary partition. A specific partitioning method is not limited thereto.

In step 803, the third voltage signal V3 having the third amplitude is applied to the touch electrode in the first tactile feedback subregion and the fourth voltage signal V4 having the fourth amplitude is applied to the touch electrode in the second tactile feedback subregion, within the second time interval. Thus, the sense of tactile feedback in the first tactile feedback subregion is different from the sense of tactile feedback in the second tactile feedback subregion because of voltage difference, such that variation of sense of tactile feedback in the tactile feedback region can be realized. In this way, the user may have a discrepant sense of tactile feedback, and thus the user's sense of tactile feedback is enriched.

Figure 9:
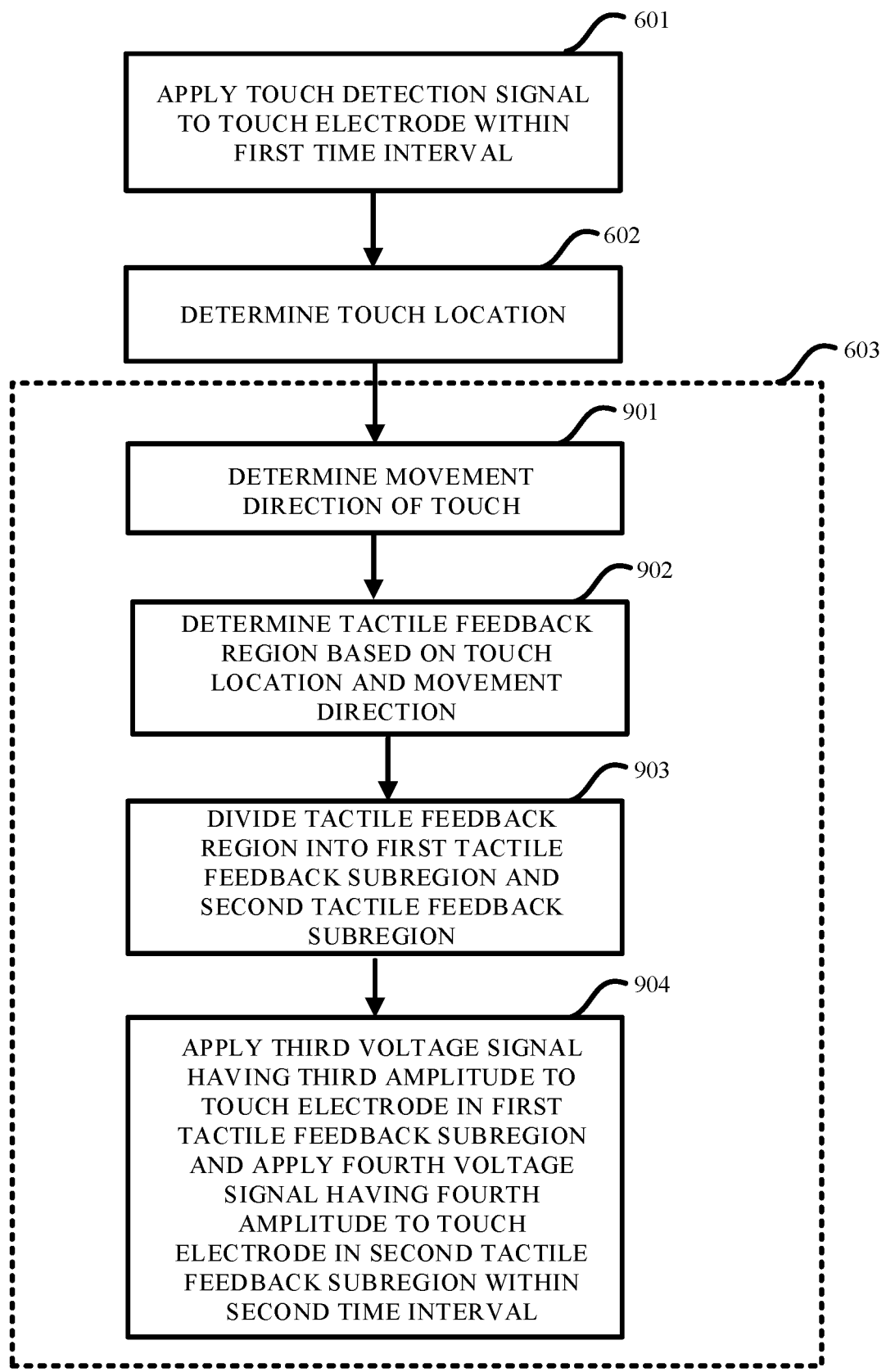
FIG. 9 is a schematic flow diagram of a drive method for driving a touch apparatus according to an embodiment of the present disclosure.

FIG. 9 illustrates a schematic flow diagram of a drive method for driving a touch apparatus according to a further embodiment of the present disclosure. Further exemplary description of step 603 in FIG. 6 is made in FIG. 9.

The movement direction of the touch is determined in step 901. In some embodiments of the present disclosure, referring to FIG. 10, two shaded regions 70 can be seen at the location of an arrowhead. Supposing the shaded region on the left is the touch location corresponding to the touch signal obtained from the first detection, the shaded region on the right is the touch location corresponding to the touch signal obtained from the second detection. As can be seen from the two shaded regions, the movement direction of the finger of the user is the direction directed by the arrowhead.

In step 902, the tactile feedback region is determined based on the touch location and the movement direction. Taking FIG. 10 as an example, it may be determined that the user is sliding the finger from left to right when the sliding direction is as directed by the arrowhead direction in FIG. 10. Therefore, the region on the right of the touch location is going to be touched by the user. In this case, the tactile feedback region is determined based on the touch location and the movement direction, which can generate the tactile feedback to the user more accurately.

In step 903, the tactile feedback region is divided into the first tactile feedback subregion and the second tactile feedback subregion. The first tactile feedback subregion and the second tactile feedback subregion may be obtained by partitioning the tactile feedback region by taking the symmetric axis of the tactile feedback region as the boundary line or may be obtained based on arbitrary partition. A specific partitioning method is not limited thereto.

In step 904, the third voltage signal V3 having the third amplitude is applied to the touch electrode in the first tactile feedback subregion and the fourth voltage signal V4 having the fourth amplitude is applied to the touch electrode in the second tactile feedback subregion, within the second time interval. Thus, the sense of tactile feedback in the first tactile feedback subregion is different from the sense of tactile feedback in the second tactile feedback subregion because of voltage difference, such that variation of sense of tactile feedback in the tactile feedback region can be realized. In this way, the user may have a discrepant sense of tactile feedback, and thus the user's sense of tactile feedback is enriched.

In some embodiments of the present disclosure, referring to FIG. 10, the shape of the tactile feedback region is a rectangle. The shapes of the first tactile feedback subregion D1 and the second tactile feedback subregion D2 are two equal-area right triangles constituting the rectangle. The touch location is positioned at a right angle of the first tactile feedback subregion D1. In an example, the finger of the user touches a region 100 containing nine regions 70 and the center of the region 100 is the touch location. When the finger moves from left to right and reaches the fourth region 100, in the fourth region 100 covered by the finger, the voltage of the touch electrode at the top right corner may be changed into the fourth voltage signal V4 having the fourth amplitude. When the finger continues moving, the number of the touch electrodes, to which the fourth voltage signal V4 is applied, of the touch electrodes covered by the finger may be gradually increased, such that smooth variation between two senses of tactile feedback is realized.

It is to be noted that a specific method for dividing the tactile feedback region is provided here. However, those skilled in the art may easily understand that there are various variants of this embodiment. For example, instead of a rectangle, the partitioned tactile feedback region may be a circle, an ellipse, or a rhombus and so on. The tactile feedback region having these shapes may be partitioned to form the first tactile feedback subregion and the second tactile feedback subregion by using other partitioning methods instead of the aforementioned method in which the rectangle is partitioned into two right triangles, as long as the smooth variation of the sense of tactile feedback in the sliding process can be realized. Furthermore, reference is made in the above embodiment by taking an example in which the finger can cover nine block electrodes. It is to be understood that when sizes of the block electrodes are changed, the number of the block electrodes covered by the finger may be different, for example, four, twelve, and sixteen, etc. Therefore, the protection scope of the present disclosure is not limited by the number of the electrodes covered by the finger in the example.

As can be seen from the above embodiments, according to the drive method for driving a touch apparatus provided by the embodiments of the present disclosure, the tactile feedback region where the finger of the user may actually move through may be determined based on the touch location and the movement direction of the touch. Gradual variation of the sense of tactile feedback when the finger of the user is sliding in the tactile feedback region may be implemented by applying two voltages to the tactile feedback region. For example, in some scenarios in which smooth sense of tactile feedback such as a piece of silk is to be felt, a relatively low voltage needs to be applied to the touch electrode such that the voltage cannot be easily sensed by the finger. However, if the voltage is too high, an apparent roughness sense may be felt. According to the drive method for driving a touch apparatus provided by the embodiments of the present disclosure, the finger may touch a plurality of regions 70, and different voltage signals for tactile feedback may be applied to different subregions, such that the voltages of the electrodes touched by the moving finger are gradually changed, and thus a smooth sense of tactile feedback and an easy method for touch sensing can be ensured.

A second aspect of the embodiments of the present disclosure provides a touch apparatus.

The touch apparatus includes a touch electrode, at least one processor, and at least one memory storing a computer program. When the computer program is executed by the at least one processor, the touch apparatus is caused to perform the aforementioned drive method for driving the touch apparatus.

The structure of the touch apparatus is not limited here. It may be an in-cell touch apparatus, an on-cell touch apparatus, or a one glass solution (OGS) touch apparatus, etc.

Solutions for integrating the touch apparatus are not limited. The touch apparatus can not only be integrated with a mutual-capacitance touch apparatus, but also be integrated with a self-capacitance touch apparatus. The display apparatus is also not limited, and it may be a liquid crystal display (LCD) device or an organic light-emitting display (OLED) device, etc. The detailed design of an electrode pattern of the touch apparatus may adopt the design for the existing touch apparatus.

In the touch apparatus provided by the embodiments of the present disclosure, the touch electrode of the touch apparatus is used as the tactile feedback electrode or the touch detection electrode in different time intervals, and a tactile feedback function and a touch positioning detection function are implemented respectively in the corresponding time intervals. Two touch functions are implemented by using one touch apparatus. By using this drive method, the electrostatic touch layer used for tactile feedback can be used in combination with mainstream capacitive touch apparatuses. Furthermore, both the fabrication process of the touch display panel and the entire thickness of the module are reduced.

A third aspect of the embodiments of the present disclosure provides a touch display apparatus.

The touch display apparatus includes the touch apparatus as previously mentioned.

In the touch display apparatus provided by the embodiments of the present disclosure, the touch electrode of the touch apparatus is used as the tactile feedback electrode or the touch detection electrode in different time intervals, and a tactile feedback function and a touch positioning detection function are implemented respectively in the corresponding time intervals. Two touch functions are implemented by using one touch apparatus. By using this drive method, the electrostatic touch layer used for tactile feedback can be used in combination with mainstream capacitive touch apparatuses. Furthermore, both the fabrication process of the touch display panel and the entire thickness of the module are reduced.

Those of ordinary skill in the art should understand that the above are merely specific embodiments of the present disclosure and are not intended to limit the present disclosure. All modifications, equivalent substitutions and improvements made within the spirit and principles of the present disclosure shall fall within the protection scope of the present disclosure.

What is claimed is:

1. A drive method for driving a mutual-capacitance touch apparatus comprising a plurality of touch drive electrodes and a plurality of touch sensing electrodes, the drive method comprising:
   applying a square-wave signal as a touch detection signal to the plurality of touch drive electrodes and setting the plurality of touch sensing electrodes to a floating state within a first time interval;
   determining a touch location of a touch;
   determining a movement direction of the touch;
   determining a tactile feedback region based on the touch location and the movement direction, wherein the tactile feedback region is a rectangle extending from the touch location towards the movement direction;
   dividing the tactile feedback region into a first tactile feedback subregion and a second tactile feedback subregion, wherein the first tactile feedback subregion and the second tactile feedback subregion are two equal-area right triangles constituting the rectangle, wherein the touch location is positioned at an undivided right angle of the rectangle, and wherein the first tactile feedback subregion and the second tactile feedback subregion each include a plurality of touch sensing electrodes; and
   applying a first voltage signal having a first frequency and a first amplitude to a touch drive electrode in the tactile feedback region, applying a same third voltage signal having a third frequency and a third amplitude to the plurality of touch sensing electrodes in the first tactile feedback subregion, and applying a same fourth voltage signal having a fourth frequency and a fourth amplitude to the plurality of touch sensing electrodes in the second tactile feedback subregion within a second time interval,
   wherein the first time interval and the second time interval are alternated but not overlapped.

2. A drive method for driving a self-capacitance touch apparatus comprising a plurality of touch electrodes, the drive method comprising,
   applying a touch detection signal to the plurality of touch electrodes within a first time interval;
   determining a touch location of a touch;
   determining a movement direction of the touch;
   determining a tactile feedback region based on the touch location and the movement direction, wherein the tactile feedback region is a rectangle extending from the touch location towards the movement direction;
   dividing the tactile feedback region into a first tactile feedback subregion and a second tactile feedback subregion, wherein the first tactile feedback subregion and the second tactile feedback subregion are two equal-area right triangles constituting the rectangle, wherein the touch location is positioned at an undivided right angle of the rectangle, and wherein the first tactile feedback subregion and the second tactile feedback subregion each include a plurality of touch electrodes; and
   applying a same third voltage signal having a third amplitude to the plurality of touch electrodes in the first tactile feedback subregion and applying a same fourth voltage signal having a fourth amplitude to the plurality of touch electrodes in the second tactile feedback subregion within a second time interval,
   wherein the first time interval and the second time interval are alternated but not overlapped.

3. A mutual-capacitance touch apparatus comprising a plurality of touch drive electrodes and a plurality of touch sensing electrodes, at least one processor, and at least one memory storing a computer program, wherein the mutual-capacitance touch apparatus is configured to, when the computer program is executed by the at least one processor, perform the drive method according to claim 1.

4. A touch display apparatus comprising the mutual-capacitance touch apparatus according to claim 3.

5. A self-capacitance touch apparatus comprising a plurality of touch drive electrodes and a plurality of touch sensing electrodes, at least one processor, and at least one memory storing a computer program, wherein the self-capacitance touch apparatus is configured to, when the computer program is executed by the at least one processor, perform the drive method according to claim 2.

6. The drive method according to claim 1, wherein the first tactile feedback subregion and the second tactile feedback subregion are arranged along the movement direction of the touch.

7. The drive method according to claim 1, wherein the tactile feedback region comprises more than one touch drive electrode and more than one touch sensing electrode.

8. The drive method according to claim 2, wherein the first tactile feedback subregion and the second tactile feedback subregion are arranged along the movement direction of the touch.

9. The drive method according to claim 2, wherein the tactile feedback region comprises 20 touch electrodes.

* * * * *